(12) United States Patent
Mola et al.

(10) Patent No.: US 9,206,838 B2
(45) Date of Patent: Dec. 8, 2015

(54) IDLER AND BEARING ASSEMBLY AND A METHOD OF MANUFACTURING SAME

(75) Inventors: Roberto Mola, Turin (IT); Gianpiero Scaltriti, Turin (IT); Alessandro Sansone, Pinerolo (IT); Francesco Gallucci, Volvera (IT)

(73) Assignee: AKTIEBOLAGET SKF, Gothenburg (SE)

( * ) Notice: Subject to any disclaimer, the term of this patent is extended or adjusted under 35 U.S.C. 154(b) by 1030 days.

(21) Appl. No.: 13/262,164

(22) PCT Filed: Apr. 3, 2009

(86) PCT No.: PCT/IT2009/000141
§ 371 (c)(1),
(2), (4) Date: Sep. 29, 2011

(87) PCT Pub. No.: WO2010/113195
PCT Pub. Date: Oct. 7, 2010

(65) Prior Publication Data
US 2012/0028745 A1 Feb. 2, 2012

(51) Int. Cl.
*F16H 55/48* (2006.01)
*F16H 55/36* (2006.01)
*F16C 13/00* (2006.01)
*F16C 35/073* (2006.01)
*F16H 7/08* (2006.01)

(52) U.S. Cl.
CPC ............ *F16C 13/006* (2013.01); *F16C 35/073* (2013.01); *F16H 55/36* (2013.01); *F16H 55/48* (2013.01); *F16H 2007/0865* (2013.01); *Y10T 29/49456* (2015.01)

(58) Field of Classification Search
CPC ............... F16C 13/006; F16C 35/073; F16H 2007/0865; F16H 2007/0863; F16H 7/12

USPC ............. 474/166; 384/546, 547, 537
See application file for complete search history.

(56) References Cited

U.S. PATENT DOCUMENTS

| 4,054,335 | A | 10/1977 | Timmer | |
|---|---|---|---|---|
| 4,917,655 | A | 4/1990 | Martin | |
| 6,142,675 | A * | 11/2000 | Brandenstein et al. | ....... 384/537 |
| 6,241,257 | B1 | 6/2001 | Hauck et al. | |
| 6,357,926 | B1 * | 3/2002 | Hauck et al. | .......... 384/546 |
| 2007/0065063 | A1 | 3/2007 | Mo Lin | |

FOREIGN PATENT DOCUMENTS

FR 2923281 A 5/2009

OTHER PUBLICATIONS

AHR International NPL Apr. 22, 2004.*

* cited by examiner

*Primary Examiner* — Sang Kim
*Assistant Examiner* — Juan Campos, Jr.
(74) *Attorney, Agent, or Firm* — Bryan Peckjian; SKF USA Inc. Patent Dept.

(57) ABSTRACT

The assembly comprises a bearing unit (10) with outer (11) and inner (12) rings and an outer wheel (20) of plastic material which is overmolded onto the outer bearing ring and is adapted for being engaged by a driving belt. A sleeve unit (30) is integral with the inner bearing ring (12). The sleeve unit includes one or more rigid tubular spacers (31, 32) and a central, plastic tubular core (33). The spacers (31, 32) are axially aligned with the inner bearing ring (12) and abut against one or both of the opposite sides (14, 15) of the inner bearing ring (12). The central tubular core (33) is overmolded into and axially extending along radially inner cylindrical surfaces (16, 34, 35) of both the inner bearing ring (12) and tubular spacer(s) (31, 32).

11 Claims, 4 Drawing Sheets

IDLER AND BEARING ASSEMBLY AND A METHOD OF MANUFACTURING SAME

CROSS-REFERENCE

This application is the US national stage of International Application No. PCT/IT2009/000141 filed on Apr. 3, 2009.

FIELD OF THE INVENTION

The present invention refers to an idler and bearing assembly of the type comprising an outer wheel body made of plastic material overmoulded onto the outer bearing ring for rotating therewith.

BACKGROUND OF THE INVENTION

It is known to use pulleys of the above kind, especially for applications as belt tensioners with motor vehicle engines. An example is given in U.S. Pat. No. 6,241,257 B1.

SUMMARY OF THE INVENTION

The object of the present invention to provide an idler and bearing assembly which can be flexibly adapted, with minimal modifications, to fit different designs of machines and engines, taking into account the specific axial position which the idler has to take so as to be aligned with a driving belt. Another object of the invention is to provide such an assembly allowing significantly lower costs in manufacturing a variety of idlers covering a range of different relative axial positions between the idler supporting shaft and the driving belt. It is still another object to provide such an idler and bearing assembly precisely defining the position of the outer surface to be engaged by the driving belt. A further object of the invention is to provide an idler bearing assembly which can be handled, transferred and mounted as a single unit.

Toward the attainment of these and additional objects and advantages, the present invention provides an idler bearing and bearing assembly. According to another aspect, the invention proposes a method of manufacturing an idler and bearing assembly.

BRIEF DESCRIPTION OF THE DRAWINGS

A few preferred, but not limiting embodiments of the invention will now be described, reference is made to the appended drawings, in which.

DETAILED DESCRIPTION OF THE INVENTION

Figure 1:
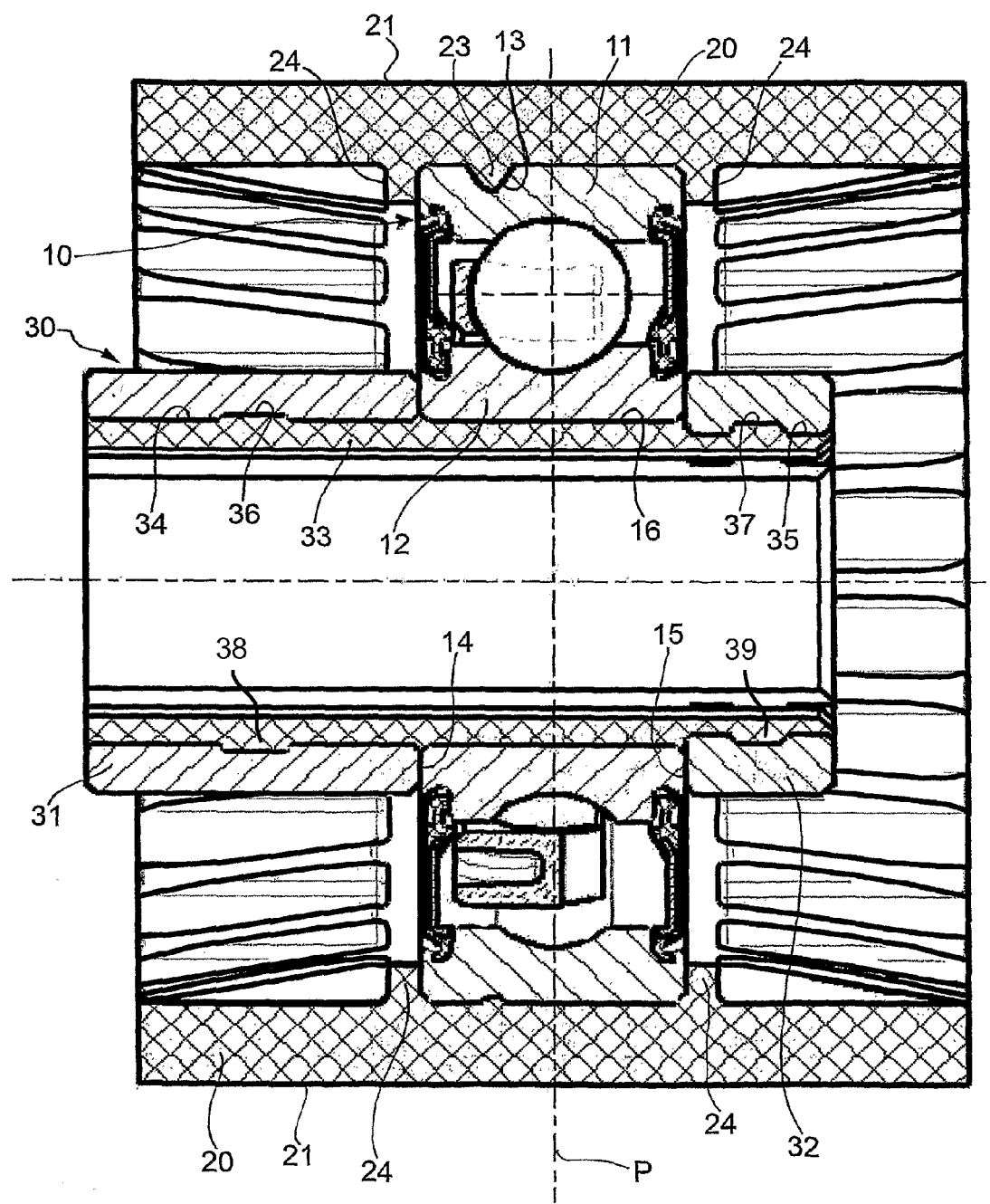
FIG. 1 is an axial cross-sectional view of an idler and bearing assembly according to a first embodiment of the invention.
Figure 2:
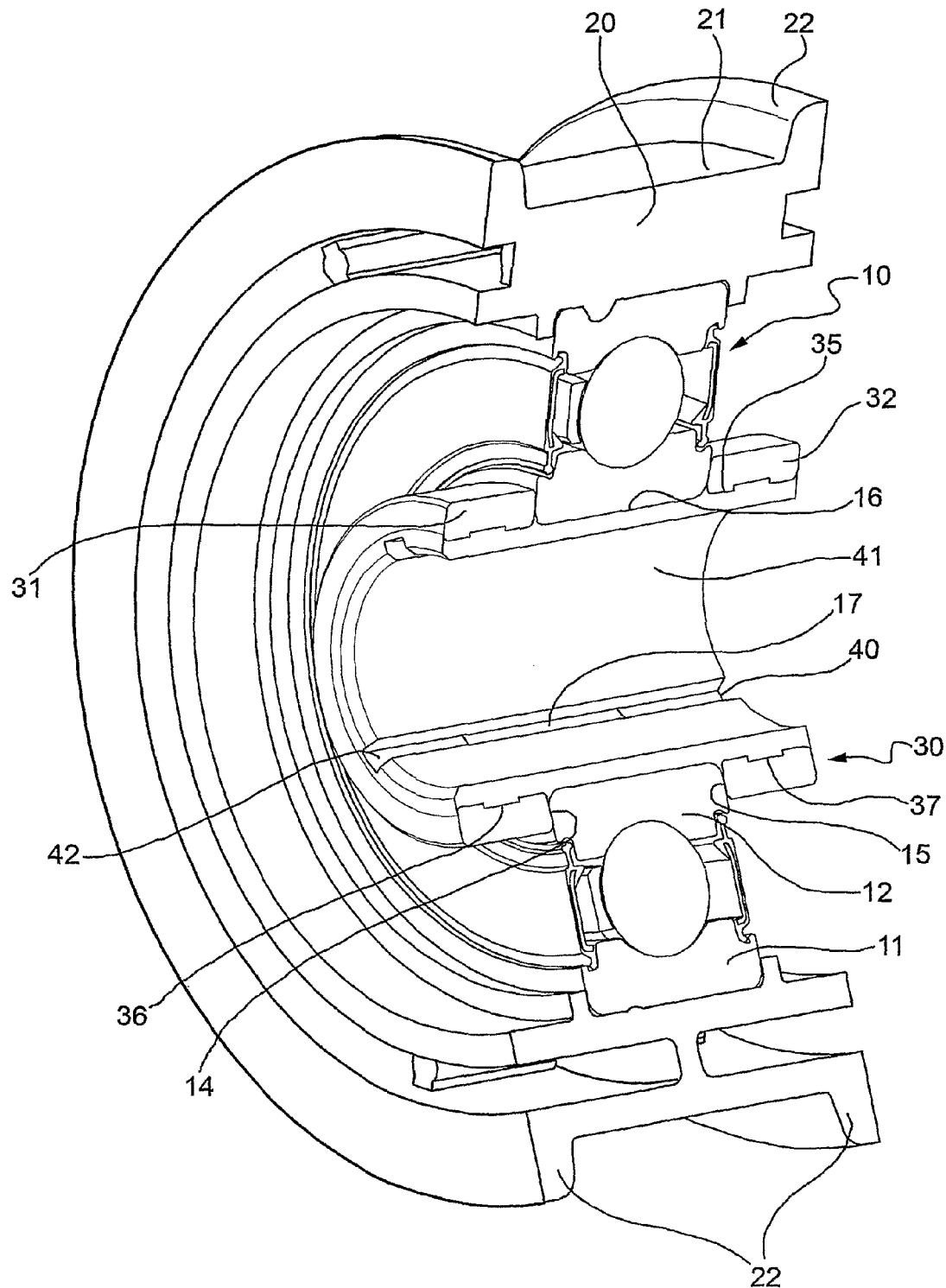
FIG. 2 is perspective, partially sectioned view of an idler and bearing assembly in accordance with a second embodiment of the invention.
Figure 3:
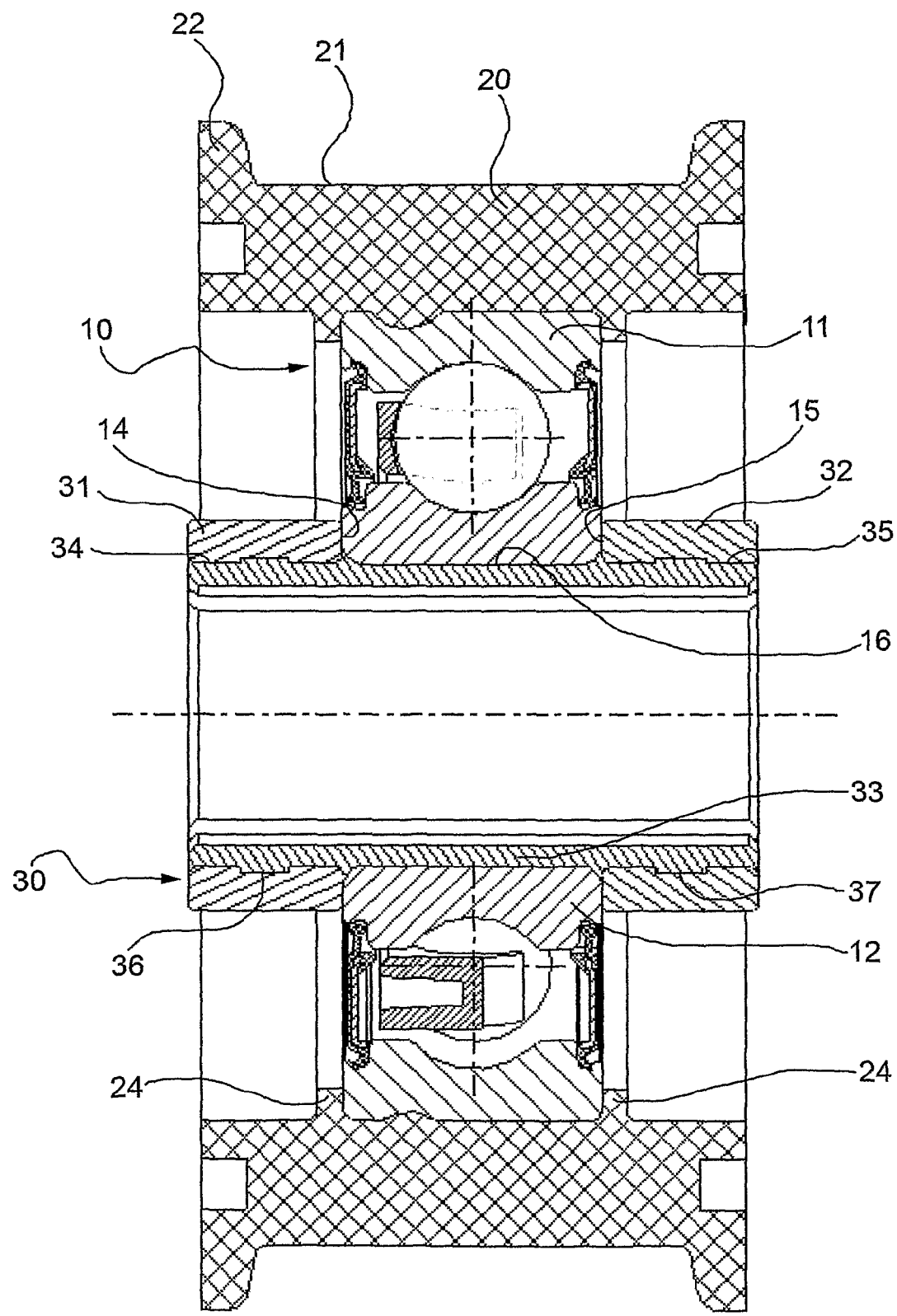
FIG. 3 is an axial cross-sectional view of the assembly of FIG. 2.

With reference to FIGS. 1 to 3, an idler bearing assembly includes a bearing unit designated overall at 10, an outer wheel body 20 of plastic material, preferably a polymer, overmoulded onto the outer bearing ring 11 and a central sleeve unit 30, adapted for receiving a shaft (not shown), is secured by moulding to the inner bearing ring 12, as described herein after. Throughout the present description and the claims, terms and expressions indicating positions and orientations such as "inner", "outer", "radial", "axial" are construed as referring to the central axis of rotation of the bearing unit, which in this example is a deep groove ball bearing unit (DGBB).

The outer wheel 20 provides a radially outermost cylindrical surface 21 adapted for being engaged in use by a driving belt (not shown). The outermost cylindrical surface may indifferently be smooth as in FIG. 1 or have protruding side edges such as those indicated 22 in FIGS. 2 and 3. A groove 13, eccentric to the axis of rotation is preferably formed in the outer cylindrical surface of the outer bearing ring, so that such a groove produces in the overmoulded plastic wheel 20 a complementary projection 23 preventing relative rotation between the plastic wheel and the outer bearing ring. Two side shoulders 24, in form of radially inwardly protruding annular edges, are preferably formed at either side of the outer bearing ring in order to further steadily fix the wheel to the bearing in the axial direction.

In the embodiments of FIGS. 1-3, the central sleeve unit 30 includes two tubular spacers 31, 32 made of a rigid material, preferably metal, abutting the opposite radial side surfaces 14, 15 of the inner bearing ring 12. Both spacers 31, 32 and the inner ring 12 are secured together by a central, tubular core 33 of plastic material overmoulded to the radially inner cylindrical surfaces 16, 34, 35 of the inner bearing ring 12 and the spacers 31, 32 and axially extending along that inner ring and spacers.

The tubular core 33 and the outer wheel 20 are overmoulded to the bearing unit 10 when this is already assembled. Preferably, and especially if the core and the wheel are to be made of the same plastic composition, they may conveniently be moulded in a same, single moulding step.

According to requirements, in an alternative embodiment the spacers 31, 32 may be made of a relatively rigid plastic material instead of metal.

Figure 4:
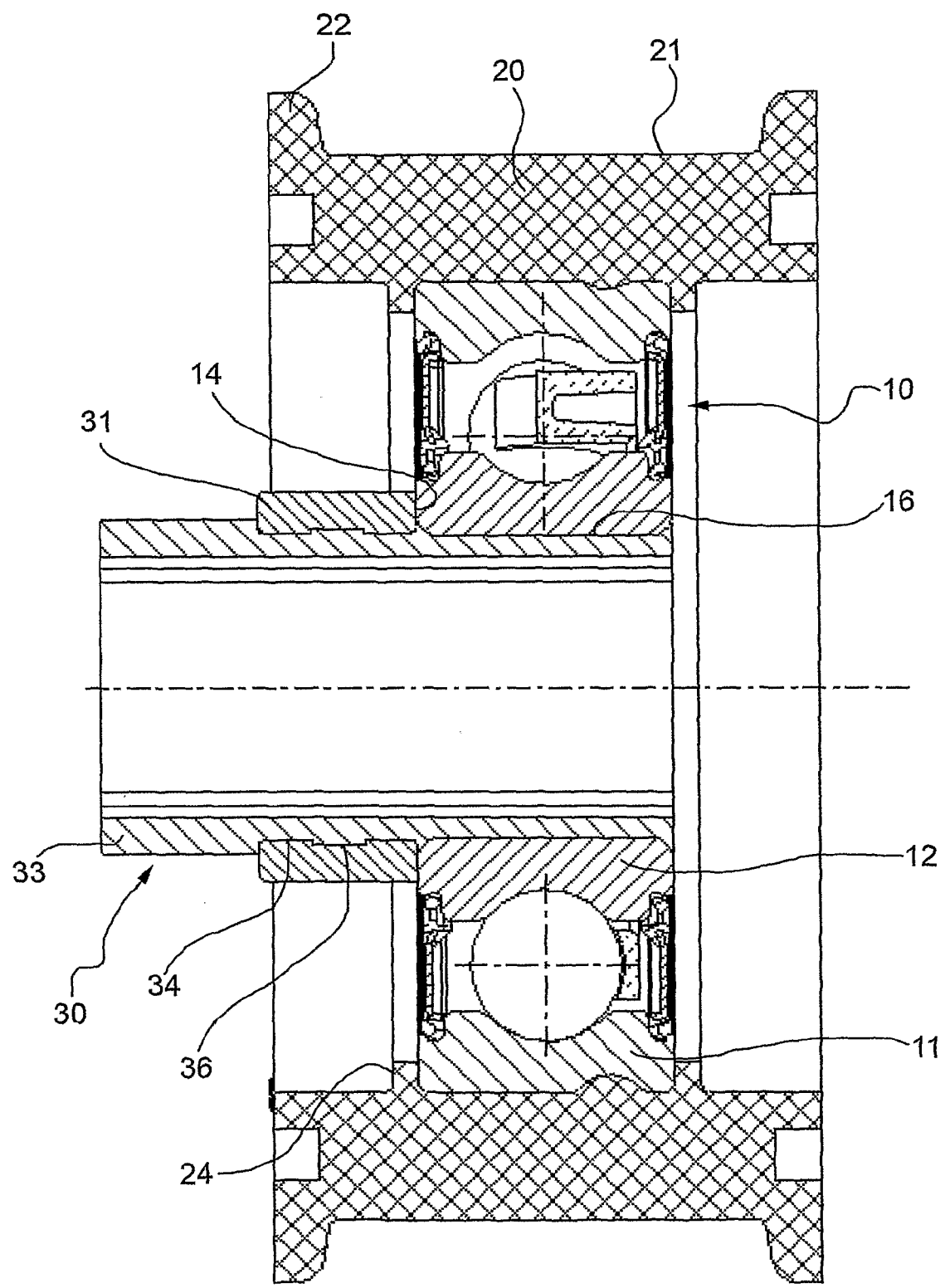
FIG. 4 is an axial cross-sectional view of an assembly according to a third embodiment of the invention.

The axial length and the number of spacers may vary depending on the specific application where the idler and bearing assembly is to be mounted. Accordingly, the spacers may be axially symmetrical with respect to a mid-plane P of the bearing and have equal length, as in the embodiment of FIGS. 2 and 3, or asymmetrical with different axial lengths, as shown in FIG. 1. In further embodiments of the invention such as that shown in FIG. 4, even only one tubular spacer 31 may be provided instead of two.

It will be appreciated that a same bearing unit and a same outer wheel design may be easily and flexibly adapted to many different applications, by simply choosing the appropriate length(s) of the spacer(s) from time to time.

Recesses such as a circular grooves 36, 37 are preferably formed in the radially inner cylindrical surfaces 34, 35 of the tubular spacers, whereby the overmoulding of the plastic material forming the central core 33 will yield plastic projections 38, 39 complementary to the grooves 36, 37. There is so provided a form coupling that improves the locking between the whole sleeve unit 30 and the inner bearing ring 12 secured thereto.

In some instances, where it is desired to achieve a particularly precise concentricity of the outer wheel with respect to the central shaft (not shown), one or more straight axial grooves 40 (FIG. 2) are formed radially outwardly extending from the innermost, cylindrical cavity 41 of the core 33. The axial grooves 40 leave portions 17 of the inner bearing ring uncovered, so that corresponding, radially protruding keys (not shown) of the central supporting shaft will provide a direct and precise contact between the metal bodies of the shaft and the bearing. The radial depth and the axial extent of the axial grooves may vary according to requirements. For example, the grooves 40 may extend only partly across the core 33, reaching the inner ring 12 from one of the two axially opposite ends of the core. In order to ensure circumferential continuity of the core, the inner diameter of the spacers 31, 32 preferably exceeds that of the inner bearing ring 12. In this manner, thin portions of plastic 42 cover the inner surface of the spacers also where the axial grooves 40 are formed. Should such grooves not extend fully across the assembly from side to side, only the spacer located on the side of these grooves and surrounding them may have a larger inner diameter, whereas the spacer on the other side may have an inner diameter equal to that of the inner bearing ring.

It will also be appreciated that the axial position of the whole assembly is guaranteed with accuracy by the rigid material, preferably metal, of the spacer(s) abutting against the steel bearing ring.

Having described the preferred embodiments, it will become apparent that various modifications can be made without departing from the scope of the invention as defined in the accompanying claims. For example, although only one spacer ring is shown on each side of the bearing, it is to be understood that in alternative embodiments two or more spacers may be located on one or both sides of the bearing in order to compose axially longer spacers.

The invention claimed is:

1. An idler and bearing assembly, comprising:
    a bearing unit with a radially outer ring and a radially inner ring; and
    an outer wheel body of a first plastic material overmoulded onto the outer bearing ring and having an outer cylindrical surface adapted for being engaged by a driving belt; and wherein
    the assembly further comprises:
    a sleeve unit integral with the inner bearing ring the sleeve unit including:
    at least one tubular spacer of a rigid material axially aligned with the inner bearing ring and abutting against at least one of the radially extending, axially opposite sides of the inner bearing ring; and
    a central tubular core of a second plastic material overmoulded into and axially extending along radially inner cylindrical surfaces of both the inner bearing ring and the at least one tubular spacer, wherein the rigid material is a different material than the second plastic material.

2. The assembly according to claim 1, wherein the at least one tubular spacer comprises two tubular spacers of the rigid material axially aligned with the inner bearing ring and abutting against respective radially extending, axially opposite sides of the inner bearing ring and wherein
    the central tubular core is overmoulded into and axially extending along the radially inner cylindrical surfaces of the inner bearing ring and the two tubular spacers.

3. The assembly according to claim 2, wherein the two spacers located on opposite sides of the inner bearing ring have a same axial length.

4. The assembly according to claim 3, wherein
    the two spacers are located axially symmetrically with respect to a mid-plane (P) of the bearing unit.

5. The assembly according to claim 2, wherein the two spacers located on opposite sides of the inner bearing ring have different axial lengths and are located axially asymmetrically with respect to a mid-plane (P) of the bearing unit.

6. The assembly according to claim 1, wherein the tubular spacer(s) is made of metal.

7. The assembly according to claim 1, wherein one or more axial grooves are formed radially outwardly extending from the inner, cylindrical cavity of the central tubular core, and wherein
    the axial grooves extend axially so as to leave uncovered portions of the radially inner cylindrical surface of the inner bearing ring.

8. The assembly according to claim 7, wherein the tubular spacer surrounding a portion of the central tubular core with the axial groove(s) has an inner cylindrical surface the diameter of which is less than the diameter of the inner cylindrical surface of the inner bearing ring, and wherein
    the plastic material of the central tubular core covers the inner cylindrical surface of the spacer also where the axial groove(s) is/are formed.

9. The assembly according to claim 1, wherein the first plastic material and the second plastic material are identical.

10. The assembly according to claim 1, wherein a recess is formed in the radially inner cylindrical surfaces of the tubular spacer(s) and wherein the overmoulding of the plastic material forming the central tubular core yields plastic protrusions complementary to said recesses that improves mechanical mutual locking of the spacer(s) and the central tubular core.

11. An idler and bearing assembly, comprising:
    a bearing unit with a radially outer ring and a radially inner ring; and
    an outer wheel body of plastic material overmoulded onto the outer bearing ring and having an outer cylindrical surface adapted for being engaged by a driving belt; and wherein
    the assembly further comprises:
    a sleeve unit integral with the inner bearing ring the sleeve unit including:
    at least one tubular spacer of rigid material axially aligned with the inner bearing ring and abutting against at least one of the radially extending, axially opposite sides of the inner bearing ring and
    a central tubular core of the plastic material overmoulded into and axially extending along radially inner cylindrical surfaces of both the inner bearing ring and the at least one tubular spacer,
    wherein a recess is formed in the radially inner cylindrical surfaces of the tubular spacer(s) and wherein
    the overmoulding of the plastic material forming the central tubular core yields plastic protrusions complementary to said recesses that improves mechanical mutual locking of the spacer(s) and the central tubular core.

* * * * *